United States Patent
Horigami et al.

(12)
(10) Patent No.: US 6,585,599 B1
(45) Date of Patent: Jul. 1, 2003

(54) GAME SYSTEM AND COMPUTER READABLE STORAGE MEDIUM WITH REDUCED WAITING PERIOD BETWEEN SELECTION AND START OF ACTION OF PLAYER CHARACTER

(75) Inventors: Atsushi Horigami, Tokyo (JP); Shinji Morimitsu, Chofu (JP); Tomohiro Maeyama, Koganei (JP); Yasushi Sakano, Tokyo (JP); Jun Nishizawa, Tokyo (JP)

(73) Assignee: Konami Computer Entertainment Japan, Inc., Tokyo (JP)

( * ) Notice: Subject to any disclaimer, the term of this patent is extended or adjusted under 35 U.S.C. 154(b) by 0 days.

(21) Appl. No.: 09/499,770

(22) Filed: Feb. 8, 2000

(30) Foreign Application Priority Data

Feb. 10, 1999 (JP) .......................... 11-033170

(51) Int. Cl.[7] ............................... A63F 13/00
(52) U.S. Cl. ........................ 463/43; 463/31
(58) Field of Search ................. 463/7, 8, 29, 30, 463/31, 32, 33, 36, 37, 38, 43, 44

(56) References Cited

U.S. PATENT DOCUMENTS 5,390,937 A * 2/1995 Sakaguchi et al. .......... 273/434
5,580,308 A * 12/1996 Nakamura ..................... 463/7
5,649,862 A * 7/1997 Sakaguchi et al. ............ 463/44
6,273,814 B1   8/2001 Komoto

* cited by examiner

*Primary Examiner*—Michael O'Neill
*Assistant Examiner*—Julie Brocketti
(74) *Attorney, Agent, or Firm*—Jordan and Hamburg LLP (57) ABSTRACT

There is provided a game system capable of enhancing the pleasure of the game by improving elements which exert influence upon the selection of a character action. In a system including a display apparatus, an input apparatus, and a game control apparatus for displaying a plurality of characters including at least one character (111) set as operation objects of the player on a game screen (110), and causing respective characters to take action in accordance with a predetermined program while referring to the output signal of the input apparatus, counting synchronized to the progress of a game is conducted by counting devices provided so as to be respectively associated with the characters of operation objects. Upon arrival of a count value of one of the counting devices at a predetermined value, processing required to make a character (111) of the operation object take action is executed in response to directions given from the player via the input apparatus. Upon start of action of the character made by that processing, a count value of the counting device is decreased by a value depending on a kind of the started action.

17 Claims, 8 Drawing Sheets

| ACTION | NAME | DESCRIPTION | AP |
|---|---|---|---|
| COMMON | | | |
| | DEFENSE | DEFENSE | 2 |
| | ESCAPE | ESCAPE | 2 |
| | | | |
| SPECIALTY | | | |
| | SECRET SWORD FLASH | MINOR ATTACK | 3 |
| | RAISESLUR | MAJOR ATTACK | 6 |
| | | | |
| MAGIC | | | |
| | STONE FIRE | SMALL MAGIC | 4 |
| | BULLET FIRE | MEDIUM MAGIC | 6 |
| | DESTROYING FIRE | LARGE MAGIC | 8 |
| | | | |

| CHARACTER | HP | MP | AC |
|:---:|:---:|:---:|:---:|
| MOUSE | 25 | 30 | 4 |
| BEAK | 30 | 5 | 6 |
| FANG | 27 | 35 | 8 |
| | | | |
| ○○ | 10 | 27 | 7 |

GAME SYSTEM AND COMPUTER READABLE STORAGE MEDIUM WITH REDUCED WAITING PERIOD BETWEEN SELECTION AND START OF ACTION OF PLAYER CHARACTER

BACKGROUND OF THE INVENTION

1. Field of the Invention

The present invention relates to such a game system that a player can virtually experience an adventure or a battle by causing a character set as an operation object of the player to act on a game screen according to directions from the player.

2. Description of the Related Art

As a game system of this kind, there is known such a role playing game as to make a hero of a game act according to directions from a player and thereby make the hero achieve a final object (such as relief of a heroine) while making the hero experience various battles and adventures. Heretofore, battles in the role playing games are typically the so-called turn systems the action chance is given alternately to the hero and his enemy. In the turn system, however, the game is fragmented, resulting in a lack of the feeling of speed and poor feeling of presence.

In a game system described in Japanese Patent Publication No. 2794230, counters are provided for respective characters, and action timing of respective characters are controlled independently for respective characters. In other words, when a certain character takes action, a waiting period is set in a counter concerning that character. When that waiting period has elapsed, the next action is determined according to directions from a player or automatically. Upon determination of the action, an operation preparation time depending on the kind of the action is set. Upon elapse of the operation preparation time, the operation of the character is started. Also when the player is selecting action of the hero, therefore, an enemy character might start his action and attack the hero. As a result, the reality of the battle of the game increases.

In a typical role playing game, various kinds of trick and magic are prepared as choices of the action to be taken by a character. In addition, various kinds of trick and magic bringing about different effects are prepared. In the game system described in the above described Japanese Patent Publication No. 2794230, the preparation time required from selection of the action until execution of the action is changed according to the kind of the action. As the effect brought about by an action becomes higher, preparation time corresponding thereto is set equal to a greater value. In the case where an action bringing a high effect has been selected, therefore, the time required from selection of the action until the action is actually started is prolonged, resulting in slow game tempo and hampered speed feeling of battles. During a time required from the selection of the action until the start of the action, the character is attacked by an opponent and becomes unable to take action. If such a state frequently occurs, the player is forced to select an action requiring a comparatively short preparation time. As a result, an action bringing about a high effect prepared with efforts is not elected, and the pleasure of the game is dampened.

SUMMARY OF THE INVENTION

Therefore, an object of the present invention is to provide a game system capable of enhancing the pleasure of the game by improving elements which exert influence upon the selection of a character action and a storage medium suited to the game system.

Hereafter, the present invention will be described. In order to facilitate understanding of the present invention, reference numerals of accompanying drawing will be added in parentheses. However, the present invention is not restricted to the illustrated embodiment thereby.

In accordance with a first aspect of the present invention, the above described problem is solved by a game system including: a display apparatus (11) capable of displaying a game screen (100); an input apparatus (14) for outputting a signal corresponding to operation of a player; and a game control apparatus (2) for displaying a plurality of characters including at least one character (111) set as operation objects of the player on the game screen, and making respective characters take action in accordance with a predetermined program while referring to the output signal of the input apparatus, wherein the game control apparatus includes: counting devices for counting synchronized with progress of a game, the counting devices being provided so as to be respectively associated with the characters of operation objects; an action control device responsive to arrival of a count value of one of the counting devices at a predetermined value, for executing processing required to make a character of the operation object take action in response to directions given from the player via the input apparatus; and a counting control device responsive to start of action of the character made by the processing of the action control device, for decreasing a count value of the counting device by a value depending on a kind of the started action.

According to the first aspect, when a count value of one of the counting devices has arrived at a predetermined value with the advance of the game, processing required to make a character of the operation object take action in response to directions given from the player is executed. Upon completion of the processing, the action of the character is immediately started. After the start of the action, the count value of the counting device is decreased by a value depending on the action. If the decreased count value is restored to a predetermined value, processing concerning the next action is started in a procedure similar to the above described procedure. Even when the decreased quantity of the count value of the counting device is differentiated according to the content (kind) of the action, therefore, the change of the waiting time according to the action content appears not before the action but after the action. Even in the case where a trick or magic having a great effect is used, therefore, the game can be advanced quickly without waiting. Thus the player can enjoy the game without a hitch. Such a situation that a character consumes the physical strength due to action and the character cannot take the next action until the physical strength is recovered can be represented. As a result, the reality of the battle or the like of the game is increased.

In accordance with a second aspect of the present invention, as processing required for making the character of the operation object take action, the action control device in the game system according to the first aspect of the invention executes processing of providing the player with an opportunity of selecting an action to be taken by the character (111) of operation object from a plurality of choices prepared beforehand via the input apparatus (14), and the action control device executes processing of ordering start of the selected action as regards the character of the operation object when the player has selected the action in response to the provided opportunity.

According to the second aspect, the player is provided with an opportunity of selecting an action to be taken by the character of operation object, when the count value of the counting device has arrived at a predetermined value. Upon completion of the selection, action start is ordered and the action of the character is started. As a result, the action start rapidly follows the action order. The game thus advances quickly.

In accordance with a third aspect of the present invention, the counting control device in the game system according to the first or second aspect of the invention decreases a count value of the counting device by a value depending on a kind of the action at a time when the action of the character has been finished or thereafter.

According to the third aspect, the count value of the counting device decreases by a quantity depending on the action after the action has finished. As a result, such a situation that the character has consumed the physical strength due to the action can be represented with greater reality.

In accordance with a fourth aspect of the present invention, a counting information display device for making information (131) corresponding to the count value of the counting device be displayed on the game screen (100) via the display apparatus (11) is provided on the game control apparatus in the game system according to one of the first to third aspects of the invention.

According to the fourth aspect, it becomes possible to make the player recognize the interval required until the next action becomes possible and the fatigue of the character after the action. As a result, the feeling of presence of the game can be strengthened.

In accordance with a fifth aspect of the present invention, the counting information display device according to the fourth aspect of the invention makes a gauge-shaped image (131) be displayed as information corresponding to the count value, and the gauge-shaped image has a length which gradually increases from a predetermined reference point toward a position corresponding to the predetermined value as the count value increases.

According to the fifth aspect, the gauge-shaped image extends as the counting advances. If the gauge-shaped image extends to a position corresponding to the predetermined value, the action becomes possible. Thus the counting situation is represented. As a result, the counting situation can be shown to the player clearly.

In accordance with a sixth aspect of the present invention, the counting device increments the count value whenever a predetermined time has elapsed on the game in the game system according to one of the first to fifth aspect of the invention.

According to the sixth aspect, the interval required for the recovery of the character after action can be represented by a time length. As a result, the player can easily grasp the length of the interval.

In accordance with a seventh aspect of the present invention, processing from the counting conducted by the counting device to the decrease of the count value is repeated, in the game system according to one of the first to sixth aspect of the invention, from a predetermined start position on the game until a predetermined condition is satisfied.

The seventh aspect of the present invention can be applied to such a case where the character repeatedly takes action in the battle of a role playing game. In addition, even in the case where use of tricks or magic having great effects is ordered as actions by the player, those actions are executed without waiting excessively. As a result, the tempo of the game can be kept nimble. As for the start position on the game, a starting time of a battle in a role playing game, for example, can be used. As for the predetermined condition, the condition that the battle is finished can be used.

In accordance with an eighth aspect of the present invention, an initial value of the counting device in the start position is set so as to become lower than the predetermined value in the game system according to the seventh aspect of the invention.

According to the eighth aspect, the interval required until the first action is started can be adjusted by the initial value. By, for example, setting the initial value of a prompt character at a higher value as compared with other characters, it becomes possible to make differences in time of start of the first actions of characters and thereby represent personalities.

In accordance with a ninth aspect of the present invention, the above described problem is solved by a game system including: a display apparatus (11) capable of displaying a game screen (100); an input apparatus (14) for outputting a signal corresponding to operation of a player; and a game control apparatus (2) for displaying a plurality of characters including at least one character (111) set as operation objects of the player on the game screen, and making respective characters take action in accordance with a predetermined program, wherein the game control apparatus includes: counting devices for counting synchronized with progress of a game, the counting devices being provided so as to be respectively associated with the characters of operation objects; a selection opportunity providing device responsive to arrival of the count value of a counting device at a predetermined value, for providing the player with an opportunity of selecting an action to be taken by the character of operation object from a plurality of choices prepared beforehand via the input apparatus; an action start ordering device for ordering start of the selected action as regards the character of the operation object, when the player has selected the action in response to the providing of opportunity conducted by the selection opportunity providing device; and a counting control device responsive to start of action of the character, for decreasing a count value of the counting device by a value depending on a kind of the started action.

In the same way as the first aspect of the present invention, according to the ninth aspect, the change of the waiting time according to the action content appears not before the action but after the action, even when the decrease quantity of the count value of the counting device is differentiated according to the content (kind) of the action. Even in the case where a trick or magic having a great effect is used, therefore, the game can be advanced quickly without waiting. Such a situation that a character consumes the physical strength due to action and the character cannot take the next action until the physical strength is recovered can be represented. As a result, the reality of the battle or the like of the game is increased. In addition, the action start rapidly follows the action order, for the same reason as the second aspect of the invention. The game thus advances quickly.

In accordance with a tenth aspect of the present invention, the above described problem is solved by a game system including: a display apparatus (11) capable of displaying a game screen (100); an input apparatus (14) for outputting a signal corresponding to operation of a player; and a game control apparatus (2) for displaying a plurality of characters including at least one character (111) set as operation objects of the player on the game screen, and making respective characters take action in accordance with a predetermined program while referring to the output signal of the input apparatus, wherein the game control apparatus includes: a plurality of counting devices respectively for counting synchronized with progress of a game, the counting devices being provided so as to be respectively associated with the plurality of characters; a selection opportunity providing device responsive to arrival of the count value of one of the counting devices associated with characters of operation objects at a predetermined value, for providing the player with an opportunity of selecting an action to be taken by the character of operation object from a plurality of choices prepared beforehand via the input apparatus; an automatic selection device responsive to arrival of the count value of one of the counting devices associated with characters (for example, 121) located outside operation objects at a predetermined value, for automatically selecting an action to be taken by the character located outside operation object; an action start ordering device for ordering start of the selected action as regards the character to which the action is assigned, when the player has selected the action in response to the providing of opportunity conducted by the selection opportunity providing device, or when the automatic selection device has selected the action; and a counting control device responsive to start of action of the character, for decreasing a count value of the counting device corresponding to the character who has started the action by a value depending on a kind of the started action.

In the same way as the ninth aspect of the invention, according to the tenth aspect, the change of the waiting time according to the action content appears not before the action but after the action, even when the decrease quantity of the count value of the counting device is differentiated according to the content (kind) of the action. Even in the case where a trick or magic having a great effect is used, therefore, the game can be advanced quickly without waiting. Such a situation that a character consumes the physical strength due to action and the character cannot take the next action until the physical strength is recovered can be represented. As a result, the reality of the battle or the like of the game is increased. In addition, the action start rapidly follows the action order. The game thus advances quickly. In addition, as for the characters located outside operation object of the player as well, the selection and start of action can be done continuously and rapidly in the same way as the character of the operation object. As a result, the game advances with further nimbler tempo.

In accordance with an eleventh aspect of the present invention, as regards each of the plurality of characters in the game system according to the tenth aspect of the invention, processing from the counting conducted by the counting device to decrease of the count value is repeated from a predetermined start position on the game until a predetermined condition is satisfied. Even in the case where use of tricks or magic having great effects is ordered as actions by the player, therefore, those actions are executed without waiting excessively, in the same way as the seventh aspect of the invention. As a result, the tempo of the game can be kept nimble.

In accordance with a twelfth aspect of the present invention, in the game system according to the eleventh aspect of the invention, the plurality of characters are divided into an ally party (110) including characters of operation object and an enemy party (120), in a field (101) on the game screen in which the characters are disposed, a first area (102) in which one of the ally party and the enemy party is disposed and a second area (103) in which the other of the ally party and the enemy party is disposed are set, and initial values in the start positions of the counting devices concerning characters disposed in the first area are set to values relatively lower than initial values in the start positions of the counting devices concerning characters disposed in the second area.

According to the twelfth aspect, the count value concerning a character of the party disposed in the first area arrives at the predetermined value later than the count value concerning a character of the party disposed in the second area. As a result, the character in the first area is late in starting action and is in a disadvantageous position. By utilizing the relation between the count value of counting device and the action start time according to the tenth and eleventh aspects of the invention, characters can be easily provided with advantages or disadvantages. Thus the pleasure of the game can be increased.

In accordance with a thirteenth aspect of the present invention, the second area (103) is set so as to encircle the first area (102) in the game system according to the twelfth aspect of the invention.

On the game screen, therefore, the characters disposed in the first area are represented as if they are surrounded by the characters disposed in the second area. Thus, the player can intuitively grasp the advantageous or disadvantageous situation depending on the area.

In accordance with a fourteenth aspect of the present invention, in the game system according to the twelfth or thirteenth aspect of the invention, the second area (103) is further divided into a plurality of small areas (103a), and as one of actions which can be selected by the characters, there is prepared an action of area effect type which exerts influence upon parameters of all characters disposed in the first area (102) or one of the small areas (103a). In the case where action of area effect type is executed, therefore, all characters of the party disposed in the first area are influenced by the action. As for the party disposed in the second area, however, characters disposed in different small areas are not influenced. As a result, an advantageous or disadvantageous situation of a party depending upon the area can be produced more clearly.

In accordance with a fifteenth aspect of the present invention, there is provided a game system including: a display apparatus (11) capable of displaying a game screen (100); an input apparatus (14) for outputting a signal corresponding to operation of a player; and a game control apparatus (2) for displaying characters of an ally party (110) including at least one character (111) set as operations objects of the player and characters of an enemy party (120) on a virtual field (101) set in the game screen, and maksing respective character take action in accordance with a predetermined program while referring to the output signal of the input apparatus, wherein the game control apparatus includes a character disposition device for setting a first area (102) and a second area (103) in the field and determining positions of respective characters on the field so as to dispose one of the ally party and the enemy party in the first area and dispose the other of the ally party and the enemy party in the second area, and wherein the second area is set so as to encircle the first area.

According to the fifteenth aspect, the characters disposed in the first area are represented as if they are surrounded by the characters disposed in the second area. The fifteenth aspect may be combined with the tenth aspect of the invention. In this case, the count value of a counting device concerning a character disposed in the first area is set so as to be relatively lower than the count value of a counting device concerning a character disposed in the second area. By doing so, it becomes possible to produce an advantageous or disadvantageous situation according to the area in the same way as the thirteenth aspect of the invention. It becomes possible for the player to intuitively grasp the situation.

In accordance with a sixteenth aspect of the present invention, in the game system according to the fifteenth aspect of the invention, the second area (103) is further divided into a plurality of small areas (103a), and as one of actions which can be selected by the characters, there is prepared an action of area effect type which exerts influence upon parameters of all characters disposed in the first area (102) or one of the small areas (103a). In the case where action of area effect type is executed, therefore, all characters of the party disposed in the first area are influenced by the action. As for the party disposed in the second area, however, characters disposed in different small areas are not influenced. As a result, an advantageous or disadvantageous situation of a party depending upon the area can be produced more clearly.

In accordance with a seventeenth aspect of the present invention, there is provided a computer readable storage medium (6) having a game program recorded thereon to display a plurality of characters including at least one character (111) set as operation objects of the player on a game screen (100), and make respective characters take action while referring to directions given by a player via a predetermined input apparatus (14), wherein the program is formed so as to make the computer (2) function as: counting devices for counting synchronized with progress of a game, the counting devices being provided so as to be respectively associated with the characters of operation objects; an action control device responsive to arrival of a count value of one of the counting devices at a predetermined value, for executing processing required to make a character of the operation object take action in response to directions given from the player via the input apparatus; and a counting control device responsive to start of action of the character made by the processing of the action control device, for decreasing a count value of the counting device by a value depending on a kind of the started action.

According to the seventeenth aspect, the program recorded on a storage medium is read by the computer. As a result, the game system according to the first aspect of the present invention can be formed.

In accordance with an eighteenth aspect of the present invention, there is provided a computer readable storage medium (6) having a game program recorded thereon to display a plurality of characters including at least one character (111) set as operation objects of the player on a game screen (100), and make respective characters take action while referring to directions given by a player via a predetermined input apparatus (14), wherein the program is formed so as to make the computer (2) function as: counting devices for counting synchronized with progress of a game, the counting devices being provided so as to be respectively associated with the characters of operation objects; a selection opportunity providing device responsive to arrival of the count value of a counting device at a predetermined value, for providing the player with an opportunity of selecting an action to be taken by the character of operation object from a plurality of choices prepared beforehand via the input apparatus; an action start ordering device for ordering start of the selected action as regards the character of the operation object, when the player has selected the action in response to the providing of opportunity conducted by the selection opportunity providing device; and a counting control device responsive to start of action of the character, for decreasing a count value of the counting device by a value depending on a kind of the started action.

According to the eighteenth aspect, the program recorded on a storage medium is read by the computer. As a result, the game system according to the ninth aspect of the present invention can be formed.

In accordance with a nineteenth aspect of the present invention, there is provided a computer readable storage medium (6) having a game program recorded thereon to display a plurality of characters including at least one character (111) set as operation objects of the player on a game screen (100), and make respective characters take action while referring to directions given by a player via a predetermined input apparatus (14), wherein the program is formed so as to make the computer function as: a plurality of counting devices respectively for counting synchronized with progress of a game, the counting devices being provided so as to be respectively associated with the plurality of characters; a selection opportunity providing device responsive to arrival of the count value of one of the counting devices associated with characters of operation objects at a predetermined value, for providing the player with an opportunity of selecting an action to be taken by the character of operation object from a plurality of choices prepared beforehand via the input apparatus; an automatic selection device responsive to arrival of the count value of one of the counting devices associated with characters located outside operation objects at a predetermined value, for automatically selecting an action to be taken by the character located outside operation object; an action start ordering device for ordering start of the selected action as regards the character to which the action is assigned, when the player has selected the action in response to the providing of opportunity conducted by the selection opportunity providing device, or when the automatic selection device has selected the action; and a counting control device responsive to start of action of the character, for decreasing a count value of the counting device corresponding to the character who has started the action by a value depending on a kind of the started action.

According to the nineteenth aspect, the program recorded on a storage medium is read by the computer. As a result, the game system according to the tenth aspect of the present invention can be formed.

In accordance with a twentieth aspect of the present invention, there is provided a computer readable storage medium (6) having a game program recorded thereon to display characters of an ally party (110) including at least one character (111) set as operation objects of a player and characters of an enemy party (120) on a virtual field (101) set in the game screen, and making respective characters take action while referring to directions given by the player via a predetermined input apparatus (14), wherein the program is formed so as to make the computer function as a character disposition device for setting a first area (102) and a second area (103) in the field and determining positions of respective characters on the field so as to dispose one of the ally party and the enemy party in the first area and dispose the other of the ally party and the enemy party in the second area, and wherein the second area is set so as to encircle the first area.

According to the twentieth aspect, the program recorded on a storage medium is read by the computer. As a result, the

DESCRIPTION OF THE PREFERRED EMBODIMENTS

Figure 1:
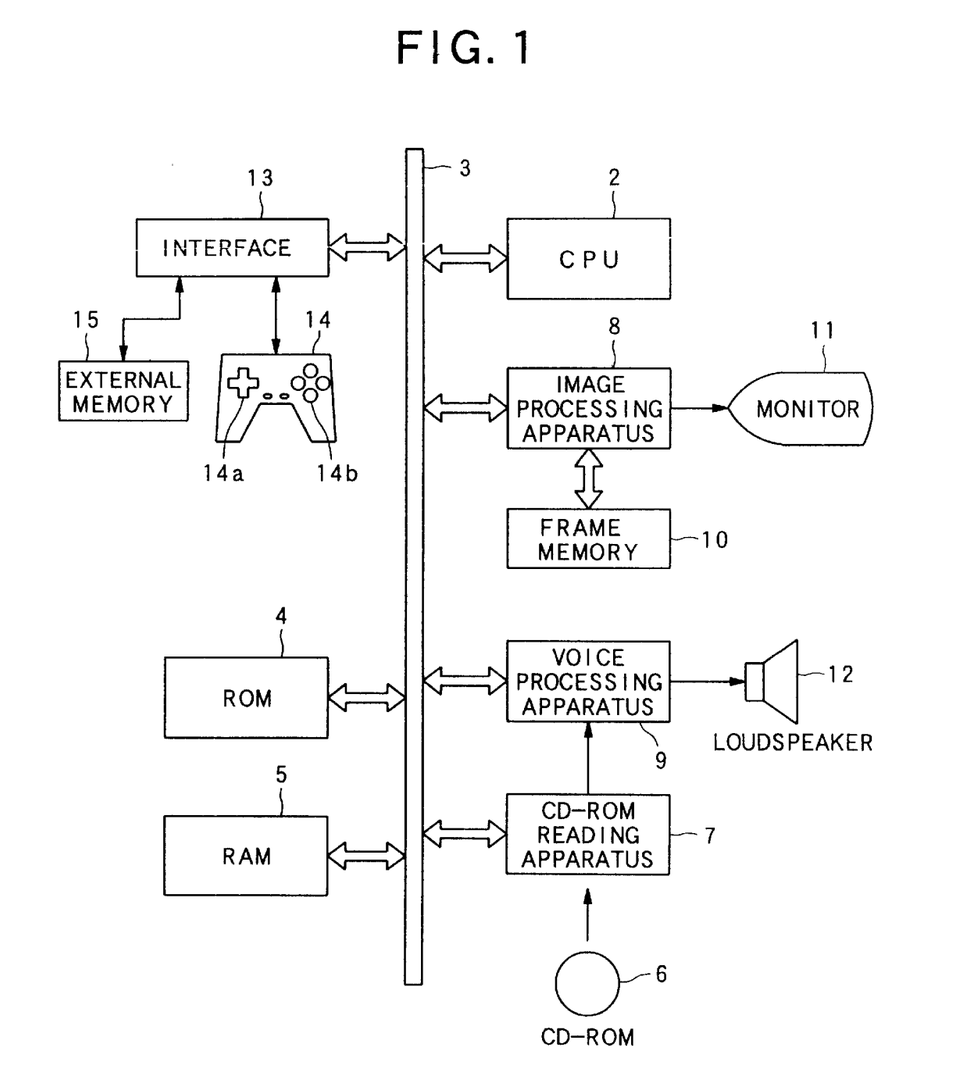
FIG. 1 is a block diagram of an embodiment of a home game system according to the present invention.

FIG. 1 is a block diagram of a home game system according to the present invention. As apparent from FIG. 1, a game system 1 includes a CPU 2 having a microprocessor unit as a main body. A ROM 4 and a RAM 5 serving as the main memories are connected to the CPU 2 via a bus 3. In the ROM 4, an operating system serving as a program required for operation control of the whole gate system 1 and data required for executing the operating system are recorded. In the RAM 5, a game program and data read from a CD-ROM 6 serving as a storage medium via a CD-ROM reading apparatus 7 are recorded. Furthermore, in the RAM 5, an area for temporarily preserving various kinds of information required for the progress of the game is set according to the program read from the CD-ROM 6. Image data read from the CD-ROM 6 and processed by the CPU 2 is also in a predetermined video area secured in the RAM 5. In addition, a RAM dedicated for display processing may be provided separately. Instead of the CD-ROM 6, a semiconductor memory, a DVD-ROM, or one of various recording media may supply the game program.

Furthermore, an image processing apparatus 8 and a voice processing apparatus 9 are connected to the CPU 2 via the bus 3. The image processing apparatus 8 reads image data from the video area of the RAM 5, and draws a game screen on a frame memory 10. In addition, the image processing apparatus 8 converts the drawn image to a video signal to be displayed on a monitor 11, and outputs the video signal at predetermined timing. The voice processing apparatus 9 converts sound data on the CD-ROM 6 read by the CD-ROM reading apparatus 7 to a predetermined analog voice signal, and outputs the analog voice signal from a loudspeaker 12. Furthermore, the voice processing apparatus 9 generates data of an effect tone or a musical tone in accordance with directions from the CPU 2, converts the data to an analog signal, and outputs the data from the loud speaker 12. A home television set and a loudspeaker attached thereto are typically used as the monitor 11 and the loudspeaker 12.

A controller 14 and an external memory 15 are detachably connected to the bus 3 via an interface 13. On the controller 14, operation members for accepting player's operation is provided. For example, a cross-shaped key 14a for inputting up, down, left and right directions and a push-button switch 14b are provided as the operation members. From the controller 14, a signal corresponding to operation states of the operation members 14a and 14b is outputted at regular interval such as 1/60 second. On the basis of that signal, the CPU 2 distinguishes the operation state of the controller 14. The external memory 15 has, for example, a semiconductor storage device capable of being rewritten and retaining the stored contents. Data indicating the progress state of the game are recorded in the external memory 15 according to directions from the player. The external memory 15 may also be provided as, for example, a component which is attachable to and detachable from the interface 13 and which forms a portable game machine.

Figure 2:
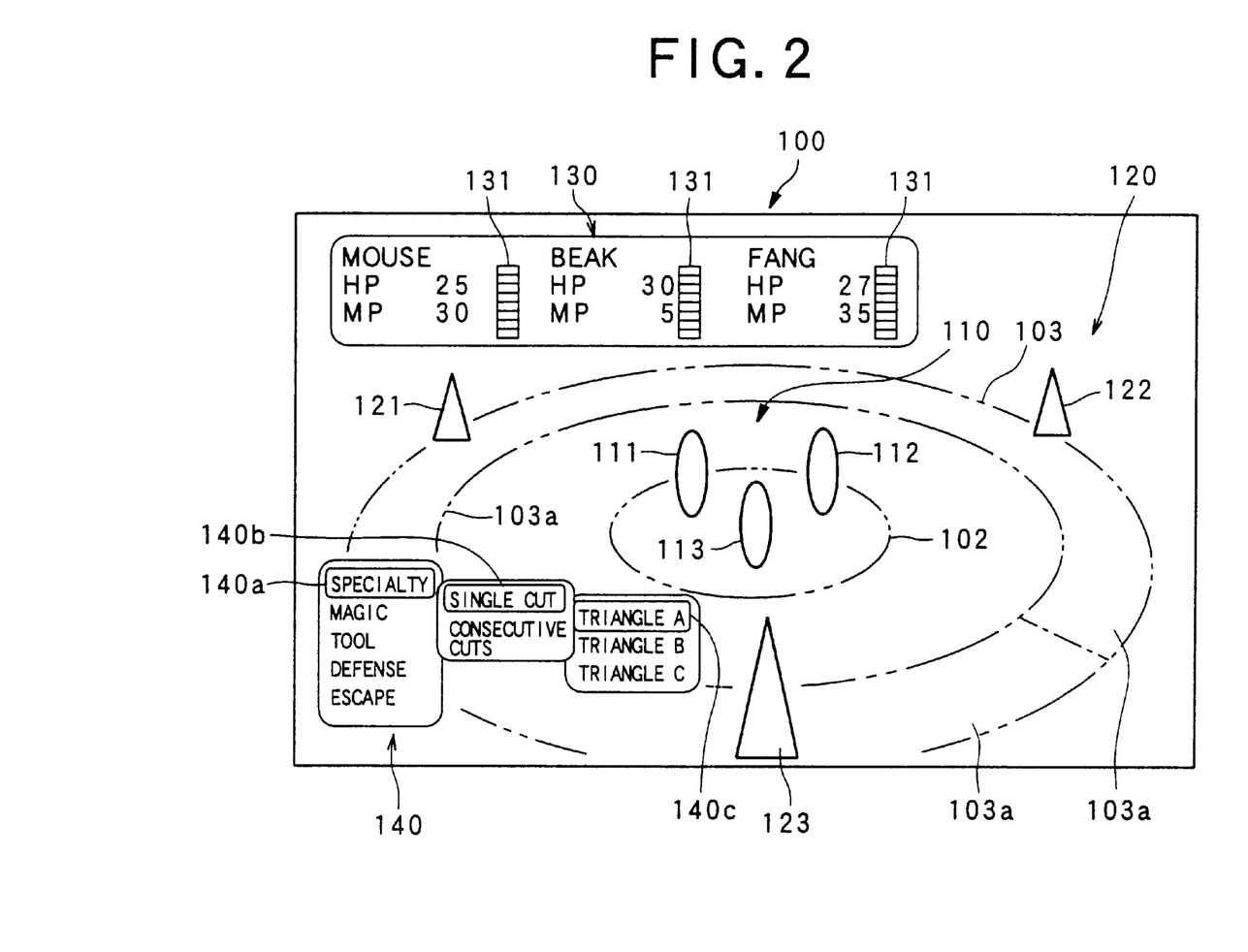
FIG. 2 is a diagram showing an outline of a screen at the time of a role playing game executed by the game system of FIG. 1.

On the ROM 6, the program for executing the role playing game is stored. FIG. 2 shows the configuration of a game screen displayed on the monitor 11 at the time of a battle in the role playing game. In a game screen 100, there is represented such a state that a character 111 of a hero of the game and two characters 112 and 113 taking the hero's side are surrounded by three-enemy characters 121, 122 and 123. The character 111 is set as the operation object of the player. As for the ally characters 112 and 113 as well, they may be operated by the player conducting predetermined switching operation on the controller 14. The hero character 111 and his ally characters 112 and 113 form an ally party 110. An assembly of enemy characters 121 to 123 forms an enemy party 120. The number of characters for the ally party 110 and the enemy party 120 is not restricted to three, but the number can be changed according to the progress of the game.

In the game screen 100, a field 101 in which the above described characters are arranged, a character information window 130, and a command selection window 140 are displayed. In the character information window 130, a hit point (represented by HP in FIG. 2) and a magic point (represented by MP in FIG. 2) which are parameters representing states of the characters 111 to 113 belonging to the ally party 110 are displayed by numerical values so as to be associated with names "Mouse", "Beak", and "Fang") of respective characters. The hit point is a value representing the physical strength of a character. In the case where a character is damaged or recovered as a result of an attack from an opponent or use of magic or an item, the hit point changes. If the hit point becomes 0, then the character is considered to be in a dying condition or be dead, and thereafter all actions become impossible. The magic point is a value consumed by the use of magic.

In the character information window 130, gauge-shaped action counters 131 extending in an up-down direction are displayed for respective characters. The action counters 131 are provided to show an interval required until each of the characters 111 to 113 can take action, to the player.

Figure 3:
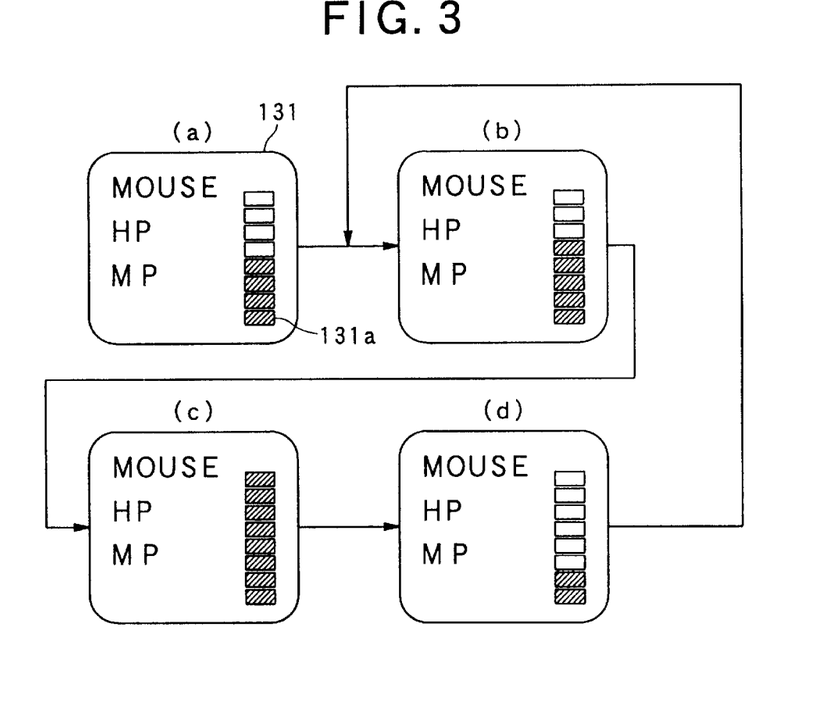
FIG. 3 is a diagram showing how an action counter displayed on the screen of FIG. 2 changes.

As shown in FIG. 3 in detail, each of the action counters 131 is formed by putting a plurality of (eight, in FIG. 3) blocks 131a in a row in the up-down direction. A bottom end of each counter 131 is used as a reference point. The number of blocks 131a represented by the same feature (color and/or luminance) indicates a current count value of the action counter 131 (hereafter referred to as action count). For example, (a) in FIG. 3 corresponds to such a state that the action count is 4.

When a battle is started, an initial value decreased from a maximum value (=8) is set as shown in (a) of FIG. 3. The initial value is not fixed, but may be changed according to the situation of the game. After the battle has been started, the value of the counter 131 is increased by one whenever a fixed time (for example, 3 seconds) elapses (see (b) of FIG. 3). If the counter 131 has arrived at the maximum value of 8 as shown in (c) of FIG. 3, processing (corresponding to processing of steps S53 to S60 of FIG. 8) required for making a character (here "Mouse") take action corresponding to the counter 131 is permitted. Until the action counter 131 arrives at the maximum value, the processing is prohibited. If the action of the character is started, the action count is decreased by a value corresponding to the started action. For example, in the example shown in FIG. 3, the action count arrives at the maximum value in (c), and thereafter the action count decreases down to 2 as shown in (d) of FIG. 3.

Figure 4:
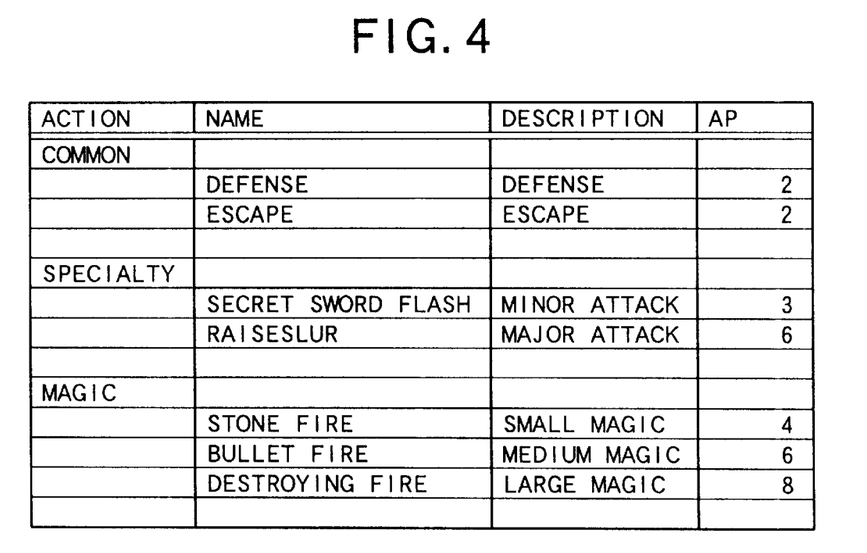
FIG. 4 is a diagram showing an example of a relation between actions of a character and decreased values of the action counter when the actions are taken.

FIG. 4 shows an example of a relation between an action which can be selected by a character and an action point (abbreviated to AP in FIG. 4) obtained when the action has been executed. The action point is obtained by weighting loss time occurred by taking the action, according to the kind of the action. The action point corresponds to a value subtracted from the action counter 131 after the action has been started.

In the example of FIG. 4, "defense" and "escape" are set as common actions to characters. For them, the action point is set to 2. Contents of "specialty" and "magic" are different from character to character. For the character shown in this example, "secret sword flash" and "raiseslur" are prepared as "specialty", and "stone fire", "bullet fire", and "destroying fire" are prepared as "magic". Differences are set for effects of these actions. For example, "raiseslur" is set as "major attack" having a greater effect than the 'secret sword flash, The greater effect the action has, the greater value the action point is set to. If an action having an unnecessarily greater effect is selected, therefore, then the interval required since the action until processing concerning the next action is started prolongs and there is an intensified fear that the character falls into a disadvantageous position because of an attack made by the opponent side during that time. By virtue of such setting, it is possible to display, in the game, how a character dissipates more physical strength and the recovery takes a longer time as an action having a greater effect is taken, and increase the reality of the battle.

In the CD-ROM 6, data defining contents of actions exemplified in FIG. 4 are recorded for each character beforehand. Those data are written into a predetermined area of the RAM 5 at least when a battle is started, so as to be able to be immediately referred to by the CPU 2.

The above described action counter 131 is displayed for every character belonging to the ally party 110. If the action count of the character set as the operation object of the player has arrived at the maximum value, then the command selection window 140 for the character is displayed on the game screen 100 (see FIG. 2). The command selection window 140 hierarchically displays actions which can be selected by the player. In the highest hierarchy, "specialty", "magic", and so on are displayed as the highest classification of the character's action.

If the player operates the cross-shaped key 14a of the controller 14 in the up-down direction, then a cursor 140a moves upward or downward. If the player operates the cross-shaped key 14a rightward, then a window which displays choices belonging to a kind enclosed with the cursor 140a at that time is opened on the right. If in that state the player operates the cross-shaped key 14a rightward again, then a window which displays choices belonging to a kind enclosed with a cursor 140b at that time is opened further on the right. If the player opens windows up to the lowest hierarchy, operates the cross-shaped key 14a upward or downward to set a cursor 140c to a desired action, and operates a predetermined decision button, then the action is selected. If the player operates the cross-shaped key 14a leftward, then the window of the lowest hierarchy at that time is closed. If the player operates the cross-shaped key 14a leftward in such a state that only the window of the highest order is open, then the command selection window 140 is closed and selection of action concerning the character is canceled. This cancel operation is conducted, for example, in the case where the order of characters is rearranged, when a plurality of characters exist as operation objects and action counts of two or more characters are at the maximum values at the same time.

Figure 5:
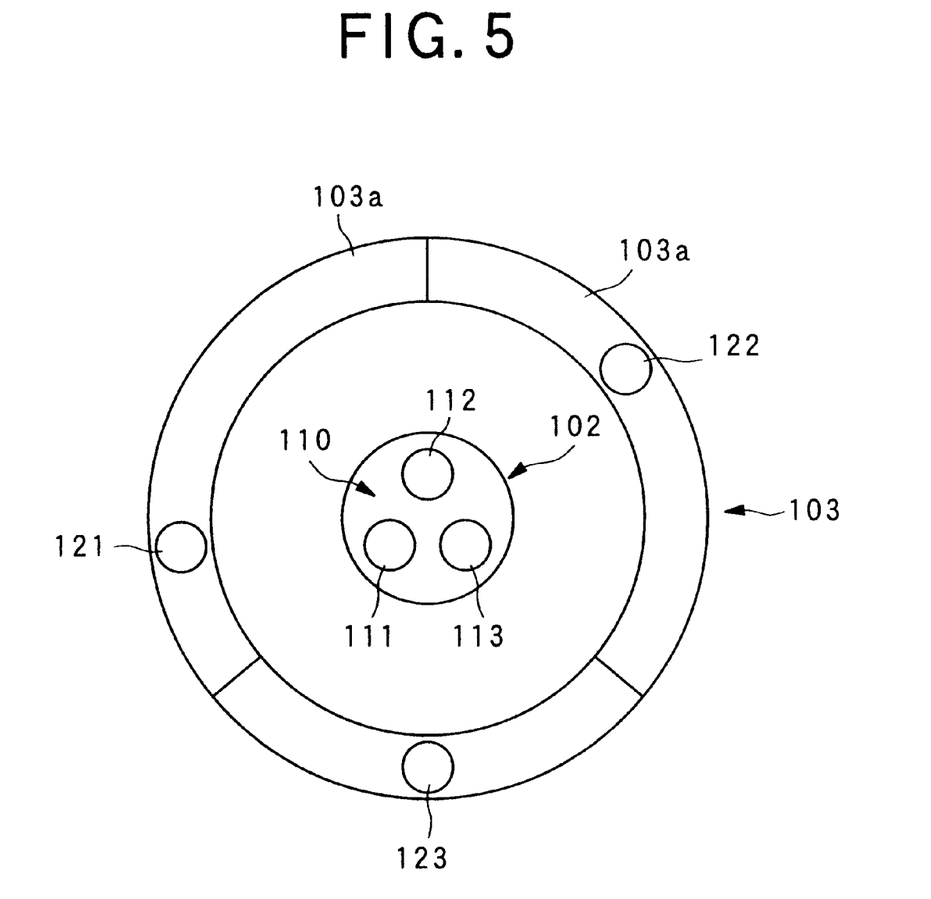
FIG. 5 is a diagram showing relations between fields displayed in the screen of FIG. 2 and arrangements of characters in the fields.

FIG. 5 shows formation of the ally party 110 and the enemy party 120 in the field 101. In the game of the present embodiment, an inner circumference area 102 set so as to be circle-shaped and a ring-shaped outer circumference area 103 set so as to enclose the inner circumference area 102 are set in the field 101 as shown in FIG. 5. When a battle is started, the ally party 110 is disposed in one of the inner circumference area 102 and the outer circumference area 103, and the enemy party 120 is disposed in the other of the inner circumference area 102 and the outer circumference area 103.

The outer circumference area 103 is further divided into a plurality of small areas 103a, ..., 103a. Characters of the party 120 (or 110) assigned to the outer circumference area 103 can be distributively disposed in the small areas 103a, ..., 103a. On the other hand, all characters of the party 110 (or 120) assigned to the inner circumference area 102 are always confined to the same area 102. However, a plurality of characters are disposed simultaneously in one small area 103a of the outer circumference area 103 in some cases. In the game system of the present embodiment, the following setting is performed on the program for the game so as to make one of the ally party 110 and the enemy party 120 disposed in the inner circumference area 102 more disadvantageous than the others of the ally party 110 and the enemy party 120 disposed in the outer circumference area 103.

First of all, various "special abilities" and "magic" are set as actions for each character as described above. However, at least a part of those actions are set as actions of area effect type bringing about effects by taking the inner circumference area 102 or one small area 103a as the unit. For example, when a character disposed in the inner circumference area 102 executes a specific kind of "magic" by taking one small area 103a as the object, then the magic exercises an effect on all characters disposed in that small area 103a, but the magic does not exercise an effect on characters disposed in different small areas 103a.

In the case where an action is selected by taking the inner circumference area 102 or a small area 103a as the unit, therefore, the party disposed in the outer circumference area 103 can select all characters disposed in the inner circumference area 102 simultaneously as action objects. On the other hand, unless all characters of the party in the outer circumference area 103 are disposed in the same small area 103a, the party disposed in the inner circumference area 102 cannot select all characters of the opponent side simultaneously as action objects. As a result, the party disposed in the outer circumference area 103 becomes more advantageous than the party disposed in the inner circumference area 102.

Furthermore, in the case where "escape" (see FIG. 4) has been selected as one of actions of a character, the CPU 2 determines whether that character could actually desert from the battle according to the battle situation. However, the probability that a character of the party disposed in the outer circumference area 103 succeeds in escape is set to be higher than that disposed in the inner circumference area 102 succeeds in escape. In the case where the character is surrounded by the party of the opponent side, therefore, such a situation that the character cannot easily desert is produced and the reality of the battle is enhanced.

Furthermore, the count value of the action counter 131 of the party disposed in the inner circumference area 102 at the starting time of battle is set to a value relatively lower than the count value of the party of the opponent side disposed in the outer circumference area 103. In other words, the count value is adjusted so as to make a first action of the party disposed in the inner circumference area 102 later than a first action of the party disposed in the outer circumference area 103. As a result, the inner circumference area 102 becomes disadvantageous one.

As actions of the area effect type, however, an action which becomes more advantageous in the effect aspect in the inner circumference area 102, such as magic for recovering hit points of all characters disposed in the inner circumference area 102 or one of the small areas 103a, is also prepared.

Figure 6:
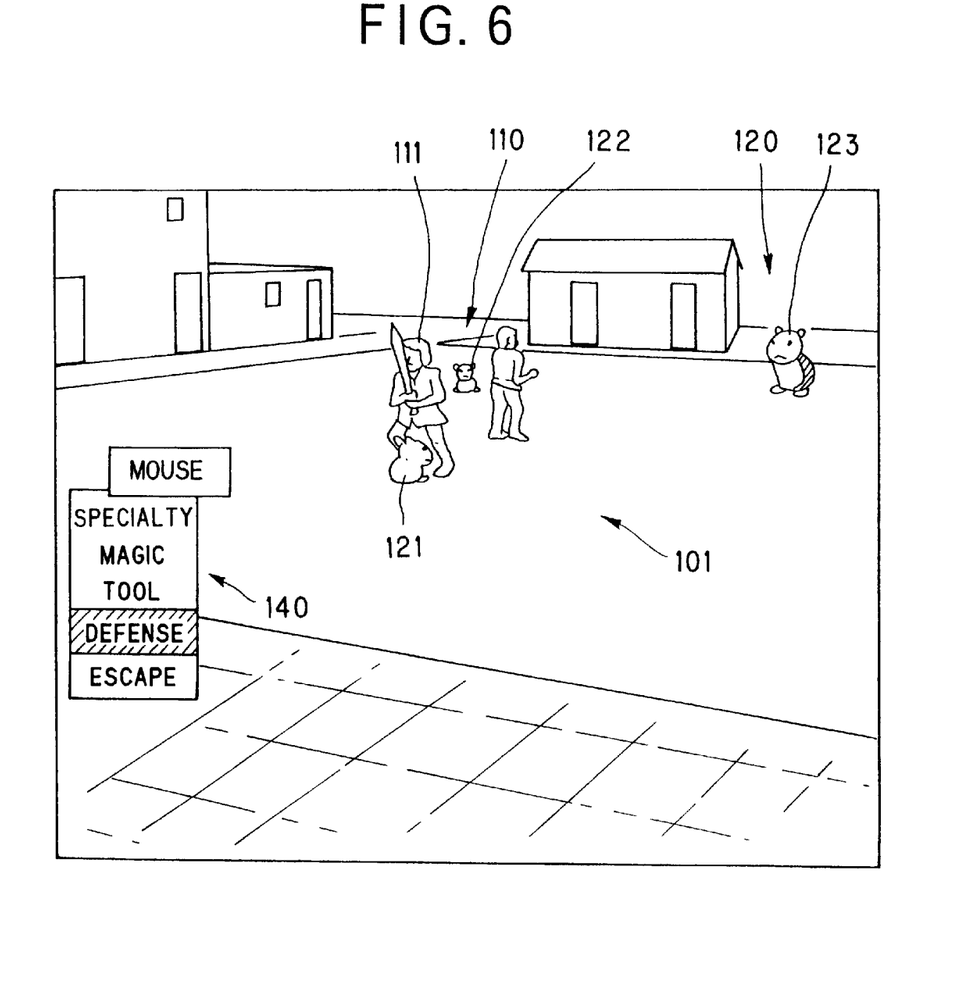
FIG. 6 is a diagram showing a concrete example of the game screen of FIG. 2.

As evident from imaginary lines of FIG. 2, a virtual camera is installed in the game screen 100 above and outside the outer circumference area 103. There is represented a video image obtained by shooting the field 101 from oblique above with the center of the inner circumference area 102 set as the observation point. However, the camera position moves along the outer circumference of the outer circumference area 103 at a suitable speed. As a result, the image of the field 101 rotates slowly around the center of the inner circumference area 102. In the case where some character takes action, a visual point switching, such as zooming up the character who has taken action, is executed. Furthermore, in the case where a specialty is used, a movie conformed to the specialty is inserted in some cases. It may be made capable of being switched from such a mode as to represent a video image obtained by overlooking nearly the whole field 101 from a virtual camera fixed in a specific position located oblique above the field to such a mode as to continuously change the camera position as described above, and vice versa according to operation on the controller 14. An example of the actual picture 100 is shown in FIG. 6. As evident from this example, a partition line indicating the areas 102 and 103 is not displayed in the field 101. However, such a disadvantageous situation that the ally party 110 is surrounded by the enemy party 120 is represented clearly.

Figure 7:
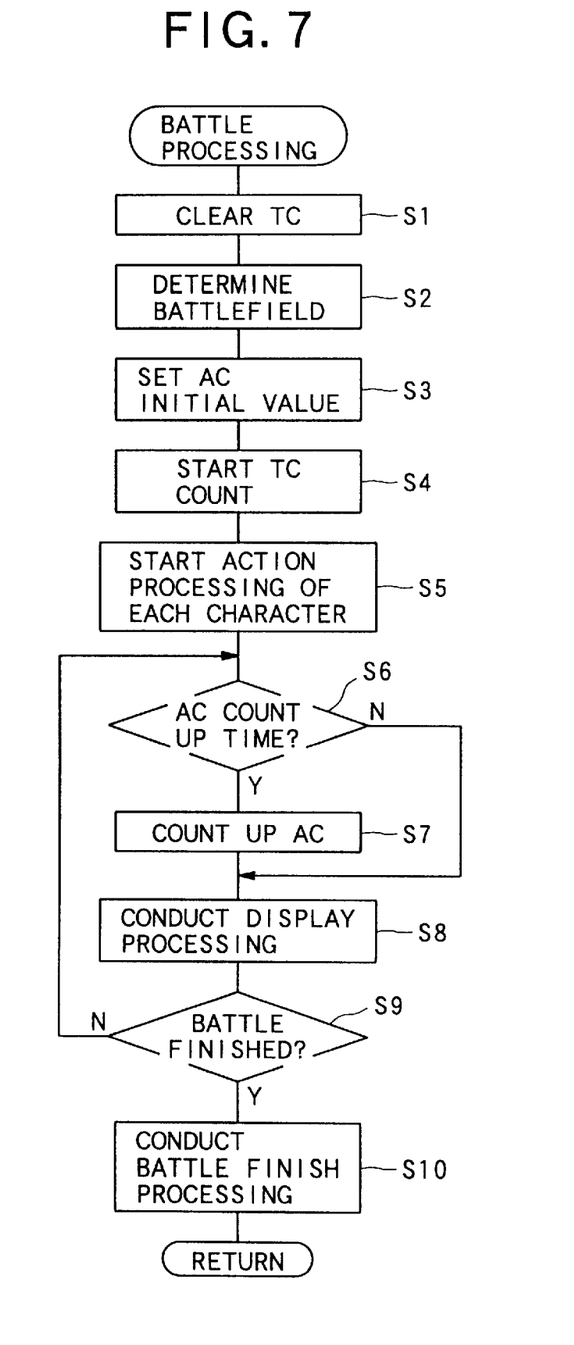
FIG. 7 is a flow chart showing a procedure of battle processing executed by a CPU when a battle is started in the role playing game executed by the game system of FIG. 1.
Figure 9:
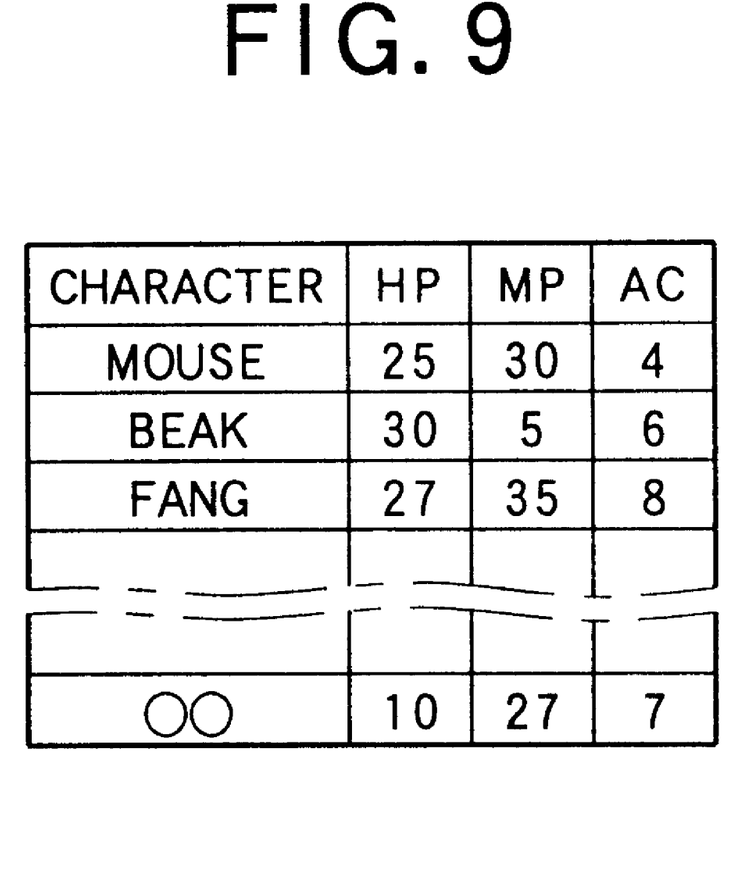
FIG. 9 is a diagram showing contents of information of each character recorded in a RAM when the processing of FIG. 7 is started.

FIG. 7 is a flow chart showing a procedure of battle processing executed by the CPU 2 at the time of the above described battle. The battle is started by, for example, encounter of the hero character with an enemy character. When this processing is executed, a time counter (denoted by TC in FIG. 7) for measuring the elapsed time of the battle is set in the RAM 5. In addition, information of all characters participating in the battle is recorded in a predetermined area of the RAM 5. As exemplified in FIG. 9, the information recorded at this time includes the hit point, magic point, and action count (denoted by AC in FIG. 9) of each character. Furthermore, data shown in FIG. 4 is also written into the RAM 5 as information of each character at the time of battle start. These kinds of information are produced not only for the ally party 110, but also for the enemy party 120.

In the processing of FIG. 7, the time counter is first cleared (step S1). A battlefield is determined on the basis of various parameters at the time of battle start (step S2). For example, it is determined in which of the inner circumference area 102 and the outer circumference area 103 each of the ally party 110 and the enemy party 120 is disposed on the basis of positions, numbers and hit points of respective characters at the starting time of battle. As to the party disposed in the outer circumference area 103, it is also determined in which small area 103a each character is disposed.

Subsequently, the action count of each character is set to an initial value (step S3). The initial value is determined independently for each character. At this time, the initial value of the action count of a character disposed in the inner circumference area 102 is set to a value relatively lower than the action count of a character disposed in the outer circumference area 103.

At subsequent step S4, time measurement (counting) using the time counter is started. Thereafter, the time measurement using the time counter is continuously conducted with a predetermined tempo so long as the battle continues. The time counter functions as the so-called time measurement device for counting the elapse of time on the game.

Figure 8:
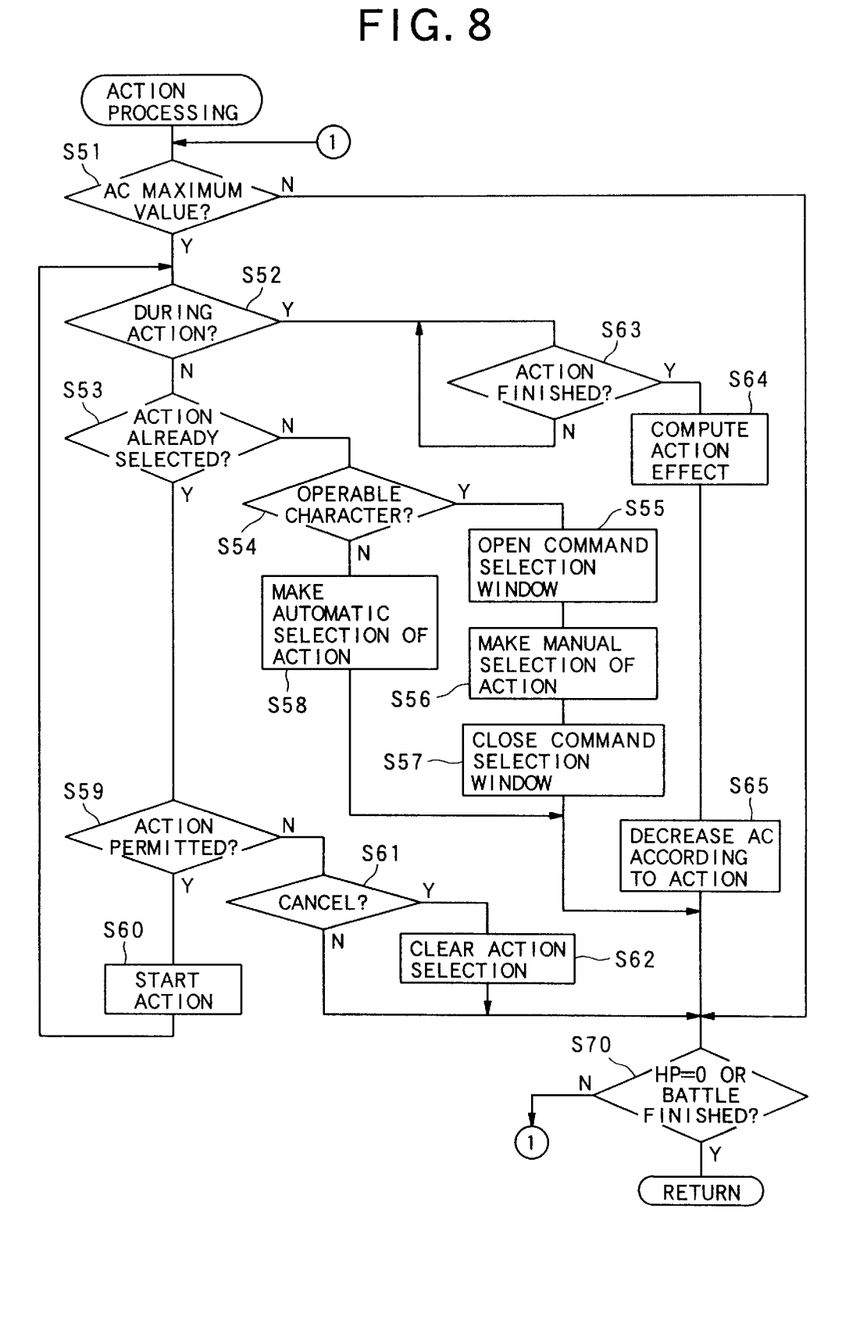
FIG. 8 is a flow chart showing a procedure of action processing started after the processing of step 55 illustrated in FIG. 7.

After the start of the time measurement using the time counter, the processing proceeds to step S5. At the step S5, action processing of each character shown in FIG. 8 is started. This will be described later. At subsequent step S6, it is determined by referring to the time measurement in the time counter whether the count up time of the action count has now been reached, in other words, whether a predetermined time (a time corresponding to one block 131a of the action counter 131) has elapsed after the count up of the last time. If the predetermined time has elapsed, then the count up time is judged to have been reached, and the processing proceeds to step S7. At the step S7, the action count of each of the characters recorded in the RAM 5 is incremented by one. As for characters having action counts which have already reached the maximum value of 8, the count up is not performed. When the count up time has not been reached, the step S7 is omitted.

At subsequent step S8, processing for updating the display of the picture 100 on the basis of the current battle situation is conducted. For example, the position and posture of a character are updated on the basis of parameters concerned in the battle situation at that time. At this time, the hit points and magic points displayed in the character information window 130 or display of the action counters are updated on the basis of the newest values at that time.

After the display processing, the processing proceeds to step S9. At the step S9, it is determined whether the battle has been finished. For example, when the hit points of all characters in one of the ally party and the enemy party have become zero, the battle is judged to have been finished. When the battle is not finished, the processing is returned to the step S6. If the battle is judged to have been finished, predetermined battle finish processing is conducted (step S10). Thereafter, the battle processing is finished.

FIG. 8 is a flow chart showing a procedure of action processing which is started in response to the above described step S5. This processing is executed individually and in parallel for all characters participating in the battle. Hereafter, only processing of one character will be described. The character which becomes the object of processing shown in FIG. 8 is referred to as object character and is discriminated from other characters.

In the action processing of FIG. 8, it is judged whether the action counter of the object character is at the maximum value of 8 (step S51). If the action counter is not at the maximum value, then the processing proceeds to step S70. At the step S70, it is judged whether the hit point of the object character is 0 or the battle has been finished. When the hit point is not 0 and the battle is not finished, the processing is returned to the step S51. On the other hand, when the hit point is 0 or the battle is judged to have been finished, the processing of FIG. 8 is finished. Therefore, the character which has become 0 in hit point cannot take action thereafter.

When the action counter is judged to be the maximum value at the step S51, the processing proceeds to step S52. At the step S52, it is judged whether the object character is currently taking action. Whether the object character is taking action is judged by referring to, for example, a flag. When the object character is not taking action, it is judged whether the next action to be taken has been selected as to the object character (step S53). When the next action has not been selected, it is judged whether the object character is a character which can be operated by the player (step S54). If the result is affirmative, then the command selection window 140 of FIG. 2 is opened (step S55). An action to be taken by the object character is manually selected on the basis of directions from the player inputted to the controller 14 (step S56). Thereafter, the command selection window 140 is closed (step S57). The processing in the step S56 is performed on the basis of the relation between the command selection window 140 and the operation of the controller 14.

On the other hand, when the object character is judged at the step S54 as a character which cannot be operated, then processing of automatically selecting action of the object character is performed at step S58. In this processing, the action may be decided by, for example, random extraction, or may be decided by considering parameters of other characters. If an action is selected at step S56 or step S58, then the selected action is recorded in the RAM 5, and thereafter the processing proceeds to step S70.

If an action is selected, then the result of the step S53 becomes affirmative and the processing proceeds to step S59. At the step S59, it is judged whether the action of the object character is permitted. For example, when a character of the opponent side set as the attack target is taking action, then the action is not permitted and a result of the step S59 becomes negative. If the action is judged at the step S59 to be permitted, then the processing proceeds to step S60 and start of the action is ordered. As a result, processing of representing how the object character takes action on the game screen 100 is executed apart from the processing of FIG. 8. If a flag indicating that the object character is taking action is set at the step S60, then the processing of the step S52 can be performed easily. On the other hand, when the action is judged at the step S59 not to be permitted, it is judged at step S61 whether the player has performed operation for canceling the action with respect to the controller 14. If the action has been canceled, then the action recorded in the RAM5 is cleared and thereafter the processing proceeds to step S70. If the cancel operation has not been conducted, then the step S62 is omitted and the processing proceeds to the step S70.

If the action is started at the step S60, then the processing is returned to the step S52. In this case, the result of the step S52 becomes affirmative since the action has been started immediately before, and the processing proceeds to step S63. At the step S63, it is judged whether the processing of displaying the action started in response to the processing of the step S60 has been finished. If this is judged to have been finished, then the effect of the action is computed at step S64. If, for example, an attack on the opponent side is executed as action, then a decrease of the hit point of the opponent side is calculated. Subsequently, by an action point corresponding to the action started at the step S60, the action count recorded in the RAM 5 is decreased (step S65). Thereafter, the processing proceeds to step S70. As described earlier, the action point is set to a greater value as the action has a greater effect. When an action having a greater effect is taken, therefore, the decrease of the action counter in the step S65 becomes greater, and the time required until the result of the step 551 becomes affirmative and the processing of the steps S53 to S60 is performed becomes longer.

In the embodiment heretofore described, the CPU 2 forms a game control apparatus. A combination of the CPU 2 and specific software forms various devices of the game control apparatus. However, at least a part of those devices may be replaced by logic circuits.

The present invention is not restricted to the embodiment heretofore described, but may be implemented in various modes. For example, the present invention is not restricted to the time of battle of a role playing game, but the present invention can be applied to any system irrespective of the genre, as long as such a game as to repetitively make characters act is executed in the system. The present invention is not restricted to home game systems, but may be formed as game systems of various scales.

According to the game system of the present invention and a storage medium used therein, it is possible to provide such a game system that a game can be advanced at quick tempo without being waited even when using tricks and magic having great effects, by causing a waiting time change depending upon the content of action of a character, after the action instead of before the action, as heretofore described. Such a situation that a character consumes the physical strength due to action and the character cannot take the next action until the physical strength is recovered can be represented on the game. As a result, the reality of the battle or the like of the game is increased, and the interest in the player can be increased.

What is claimed is:

1. A game system comprising:

a display apparatus capable of displaying a game screen;

an input apparatus for outputting a signal corresponding to operation of a player; and a game control apparatus for displaying characters including at least one character set as an operation object oft he player on the game screen, and making respective characters take action in accordance with a predetermined program while referring to the output signal of the input apparatus, wherein the game control apparatus comprises:

counting devices for counting synchronized with progress of a game, the counting devices being provided so as to be respectively associated with the characters of operation objects;

an action control device responsive to arrival of a count value of one of the counting devices at a predetermined value, for executing processing required to make a character of the operation object take action in response to directions given from the player via the input apparatus; and a counting control device responsive to a start of action of the character made by the processing of the action control device, for decreasing a count value of the counting device by a value depending on a kind of the started action so as to make a waiting time corresponding to the action selected by the player start to run after execution of the action by the character has commenced.

2. A game system according to claim 1, wherein as processing required for making the character of the operation object take action, the action control device executes processing of providing the player with an opportunity of selecting an action to be taken by the character of operation object from a plurality of choices prepared beforehand via the input apparatus, and the action control device executes processing of ordering the start of the selected action as regards the character of the operation object when the player has selected the action in response to the provided opportunity.

3. A game system according to claim 1 or 2, wherein the counting control device decreases a count value of the counting device by a value depending on a kind of the action at a time when the action of the character has been finished or thereafter.

4. A game system according to claim 1 or 2, wherein a counting information display device for creating information corresponding to the count value of the counting device which is displayed on the game screen via the display apparatus is provided on the game control apparatus.

5. A game system according to claim 4, wherein the counting information display device creates a gauge-shaped image which is displayed as information corresponding to the count value, and the gauge-shaped image has a length which gradually increases from a predetermined reference point toward a position corresponding to the predetermined value as the count value increases.

6. A game system according to anyone of claims 1 or 2, wherein the counting device increments the count value whenever a predetermined time has elapsed on the game.

7. A game system according to any one of claims 1 or 2, wherein processing from the counting conducted by the counting device to decrease of the count value is repeated from a predetermined start position on the game until a predetermined condition is satisfied.

8. A game system according to claim 1 or 2, wherein an initial value of the counting device in the start position is set so as to become lower than the predetermined value.

9. A game system comprising:

a display apparatus capable of displaying a game screen;

an input apparatus for outputting a signal corresponding to operation of a player; and a game control apparatus for displaying a plurality of characters including at least one character set as an operation object of the player on the game screen, and making respective characters take action in accordance with a predetermined program, wherein the game control apparatus comprises:

counting devices for counting synchronized with progress of a game, the counting devices being provided so as to be respectively associated with the characters of operation objects;

a selection opportunity providing device responsive to arrival of the count value of a counting device at a predetermined value, for providing the player with an opportunity of selecting an action to be taken by the character of operation object from a plurality of choices prepared beforehand via the input apparatus;

an action start ordering device for ordering a start of the selected action as regards the character of the operation object, when the player has selected the the action in response to the providing of opportunity conducted by the selection opportunity providing device; and a counting control device responsive to the start of action of the character, for decreasing a count value of the counting device by a value depending on a kind of the started action so as to make a waiting time corresponding to the action selected by the player start to run after execution of the action by the character has commenced.

10. A game system comprising:

a display apparatus capable of displaying a game screen;

an input apparatus for outputting a signal corresponding to operation of a player; and a game control apparatus for displaying a plurality of characters including at least one character set as an operation object of the player on the game screen, and making respective characters take action in accordance with a predetermined program while referring to the output signal of the input apparatus, wherein the game control apparatus comprises:

a plurality of counting devices respectively for counting synchronized with progress of a game, the counting devices being provided so as to be respectively associated with the plurality of characters;

a selection opportunity providing device responsive to arrival of the count value of one of the counting devices associated with characters of operation objects at a predetermined value, for providing the player with an opportunity of selecting an action to be taken by the character of the operation object from a plurality of choices prepared beforehand via the input apparatus;

an automatic selection device responsive to arrival of the count value of one of the counting devices associated with characters located outside of the operation object at a predetermined value, for automatically selecting an action to be taken by the character located outside of the operation object;

an action start ordering device for ordering a start of the selected action of the character to which the action is assigned, when the player has selected the action in response to the providing of opportunity conducted by the selection opportunity providing device, or when the automatic selection device has selected the action; and a counting control device responsive to the start of action of the character, for decreasing a count value of the counting device corresponding to the character who has started the action by a value depending on a kind of the started action so as to make a waiting time corresponding to the action selected by the player start to run after execution of the action by the character has commenced.

11. A game system according to claim 10, wherein with regard to each of the plurality of characters, processing from the counting conducted by the counting device to decrease of the count value is repeated from a predetermined start position on the game until a predetermined condition is satisfied.

12. A game system according to claim 11, wherein the plurality of characters are divided into an ally party including characters of operation object and an enemy party, in a field on the game screen in which the characters are disposed, a first area in which one of the ally party and the enemy party is disposed and a second area in which the other of the ally party and the enemy party is disposed are set, and initial values in the start positions of the counting devices concerning characters disposed in the first area are set to values relatively lower than initial values in the start positions of the counting devices concerning characters disposed in the second area.

13. A game system according to claim 12, wherein the second area is set so as to encircle the first area.

14. A game system according to claim 12 or 13, wherein the second area is further divided into a plurality of small areas, and as one of actions which can be selected by the characters, there is prepared an action of area effect type which exerts influence upon parameters of all characters disposed in the first area or one of the small areas.

15. A computer readable storage medium having a game program recorded thereon to display a plurality of characters including at least one character set as an operation object of the player on a game screen, and make respective characters take action while referring to directions given by a player via a predetermined input apparatus, wherein the program is formed so as to make the computer function as:

counting devices for counting synchronized with progress of a game, the counting devices being provided so as to be respectively associated with the characters of operation objects;

an action control device responsive to arrival of a count value of one of the counting devices at a predetermined value, for executing processing required to make a character of the operation object take action in response to directions given from the player via the input apparatus; and a counting control device responsive to a start of action of the character made by the processing of the action control device, for decreasing a count value of the counting device by a value depending on a kind of the started action so as to make a waiting time corresponding to the action selected by the player start to run after execution of the action by the character has commenced.

16. A computer readable storage medium having a game program recorded thereon to display a plurality of characters including at least one character set as an operation object of the player on a game screen, and make respective characters take action while referring to directions given by a player via a predetermined input apparatus, the program comprising executable code for execution by a computer processor causing said computer processor to function as:

counting devices for counting synchronized with progress of a game, the counting devices being provided so as to be respectively associated with the characters of operation objects;

a selection opportunity providing device responsive to arrival of the count value of a counting device at a predetermined value, for providing the player with an opportunity of selecting an action to be taken by the character of operation object from a plurality of choices prepared beforehand via the input apparatus;

an action start ordering device for ordering a start of the selected action as regards the character of the operation object, when the player has selected the action in response to the providing of opportunity conducted by the selection opportunity providing device; and a counting control device responsive to start of action of the character, for decreasing a count value of the counting device by a value depending on a kind of the started action so as to make a waiting time corresponding to the action selected by the player start to run after execution of the action by the character has commenced.

17. A computer readable storage medium having a game program recorded thereon to display a plurality of characters including at least one character set as an operation object of the player on a game screen, and make respective characters take action while referring to directions given by a player via a predetermined input apparatus, the program comprising executable code for execution by a computer processor causing said computer processor to function as:

counting devices respectively for counting synchronized with progress of a game, the counting devices being provided so as to be respectively associated with the plurality of characters;

a selection opportunity providing device responsive to arrival of the count value of one of the counting devices associated with characters of operation objects at a predetermined value, for providing the player with an opportunity of selecting an action to be taken by the character of operation object from a plurality of choices prepared beforehand via the input apparatus;

an automatic selection device responsive to arrival of the count value of one of the counting devices associated with characters located outside of the operation object at a predetermined value, for automatically selecting an action to be taken by the character located outside operation object;

an action start ordering device for ordering a start of the selected action as regards the character to which the action is assigned, when the player has selected the action in response to the providing of opportunity conducted by the selection opportunity providing device, or when the automatic selection device has selected the action; and a counting control device responsive to the start of action of the character, for decreasing a count value of the counting device corresponding to the character who has started the action by a value depending on a kind of the started action so as to make a waiting time corresponding to the action selected by the player start to run after execution of the action by the character has commenced.

* * * * *